Sept. 8, 1942.　　　　E. B. CLARK　　　　2,295,333
BOX SUPPORTING DEVICE
Filed July 10, 1941
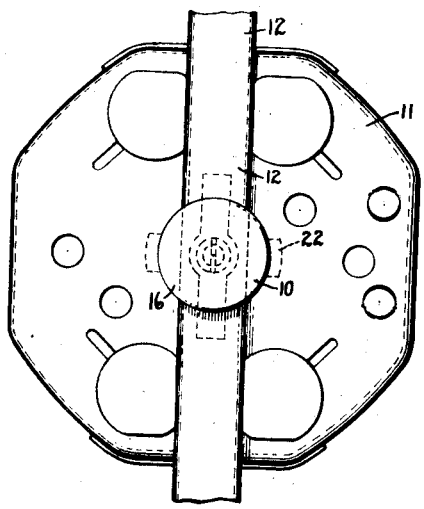
Fig. 1.
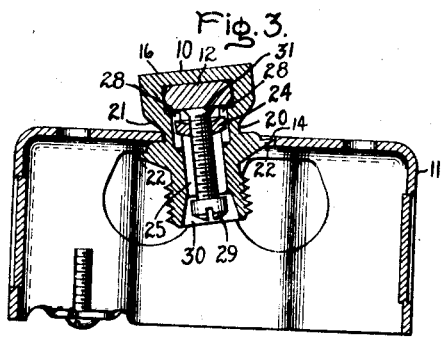
Fig. 3.
Fig. 4.
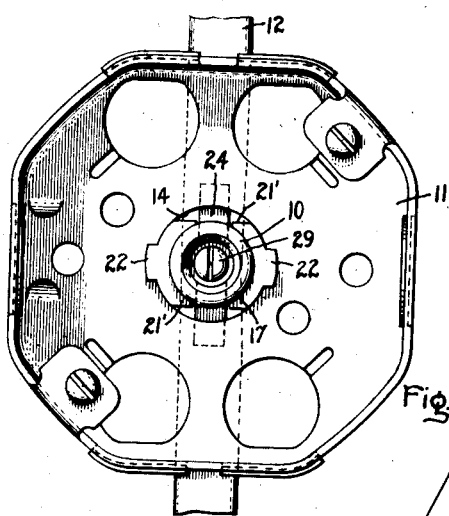
Fig. 2.
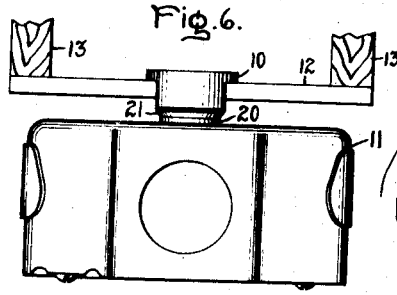
Fig. 6.
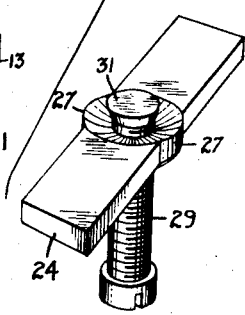
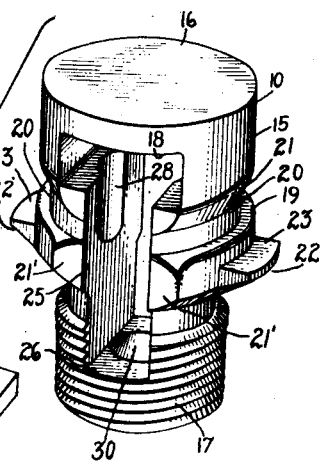
Fig. 5.
Inventor:
Edward B. Clark,
by Harry E. Dunham
His Attorney.

Patented Sept. 8, 1942

2,295,333

UNITED STATES PATENT OFFICE 2,295,333

BOX SUPPORTING DEVICE

Edward B. Clark, Milford, Conn., assignor to General Electric Company, a corporation of New York Application July 10, 1941, Serial No. 401,803

6 Claims. (Cl. 174—63)

My invention relates to a box supporting device and more particularly to a stud assembly for adjustably mounting electric outlet boxes, or the like, on a support, such as a bar hanger.

In wiring systems for buildings, it is customary to provide outlet boxes at convenient points to receive the terminals of the various wires for splicing and to provide a supporting means for the associated electrical fixtures, such as lighting fixtures, which are connected into the system. In most cases, these outlet boxes are supported on a bar hanger attached to the frame of the building. To this end, the bar hanger is provided with a stud to which the outlet box is fastened, a portion of the stud extending into the interior of the outlet box for engagement with the supporting means of the associated electrical fixtures. It is frequently necessary to adjust the outlet box along the length of the bar hanger, when it is desired to center a lighting fixture in a particular location. This is accomplished by slidably mounting the supporting stud on the bar hanger. In former constructions, the stud has been located in adjusted position on the bar hanger by means of a lock screw inserted through the stud and engaging the hanger. The outlet box has then been mounted on the stud by means of a lock nut threaded around that portion of the stud extending into the interior of the box. This meant that two separate locking means were necessary to secure the outlet box in the correct position, one to lock the stud on the hanger and the other to lock the outlet box on the stud. My invention, however, overcomes the necessity of two locking means, since it provides means whereby only a single locking arrangement is necessary to accomplish both of these purposes.

It is an object of my invention to provide an improved and simplified form of supporting device for securing an outlet box to a bar hanger in which a single locking means is employed to accomplish the dual purpose of fastening the outlet box to the stud and locking the stud in position on the hanger.

A further object of my invention is to provide a box supporting device so constructed and arranged that the outlet box may be easily and quickly mounted in position on a supporting stud.

In the accompanying drawing, Fig. 1 is a plan view of the exterior of an outlet box showing the box mounted on a bar hanger by my supporting device; Fig. 2 is a view of the interior of the box showing the arrangement of the supporting device; Figs. 3 and 4 illustrate the manner in which the outlet box is mounted on the supporting stud; Fig. 5 is an enlarged exploded view of the box supporting device and Fig. 6 is a side view of an outlet box supported on a bar hanger.

Referring to the drawing, I show a box supporting device 10 for mounting an outlet box 11 on a bar hanger 12, the bar hanger in turn being fastened to the spaced supports 13 forming part of the frame of a building. The box supporting device extends through an opening 14 in the wall of the outlet box. In some cases, the opening 14 may be closed by a knockout which is removed when the outlet box is mounted on the supporting device.

Referring to Fig. 5 of the drawing, my box supporting device comprises a stud 15 of generally cylindrical form which is provided with an enlarged head 16 at one end and a threaded shank 17 at the other end. The head 16 is provided with a transverse opening 18 for receiving the bar hanger. In the form of the invention illustrated, the opening 18 is rectangular to receive the rectangular bar hanger 12 but manifestly the opening may be given other shapes, depending upon the configuration of the bar hanger on which the stud is to be mounted. To mount the stud in position, it is simply slipped over the end of the bar hanger so that the bar hanger extends through the opening, in the manner shown by Fig. 4. Between the threaded shank 17 and the head 16, the stud is provided with a substantially annular shoulder 19, the diameter of which is only slightly less than that of the opening 14. Adjacent the shoulder 19, opposite sides of the stud are provided with a recess 20, one wall of which is formed by the shoulder 19 and the other wall of which is beveled, as indicated at 21. Opposite sides of the stud between the recess 20 are formed with flat faces 21' to facilitate insertion through the opening. The diameter of the stud at the point between the recesses 20 is considerably reduced; in any event, it is less than that of the opening 14 in the outlet box. Extending outwardly from opposite sides of the stud at points adjacent the recesses 20 are lips 22 provided with flat surfaces 23 for engaging the interior wall of the outlet box in a manner to be described later.

In order to lock the stud in position, I provide a plate 24 which is in the form of an elongated sheet metal strip having arms extending beyond the confines of the stud and adapted to engage the wall of the outlet box on opposite sides of the opening 14. This plate is received in a slot 25 formed transversely of the stud and extending from the opening 18 to a point spaced a short distance from the bottom of the threaded shank 17, as indicated at 26. In order to guide the plate for longitudinal movement lengthwise of the slot 25, the plate is formed with arcuate projecting surfaces 27 which fit into corresponding arcuate grooves 28 in the walls of the slot 25. A locking screw 29 is threaded into the plate 24 and is peened over at its end, as indicated at 31, to prevent its becoming detached. The plate and locking screw are mounted in assembled position on the stud by inserting the plate transversely through the opening 18, the screw being simultaneously inserted in the slot 25. When the projecting surfaces 27 on the plate coincide with the grooves 28, the plate may be moved downwardly lengthwise of the slot and stud into assembled position. In this position, the head of the locking screw 29 will extend partly into an opening 30 formed in the end of the threaded shank of the stud and through which the locking screw is accessible for adjustment.

The plate may be held in assembled position by placing the stud on the hanger so that the projections 27 cannot be moved lengthwise out of the groove 28. Alternatively, and in those cases where it is not desired to mount the stud on a hanger, the screw 29 may be threaded up into engagement with the wall of the opening 18 so that the plate cannot be moved out of engagement with the grooves 28.

The construction described lends itself to ease in manufacture due to the fact that the plate may be punched from strip stock and then tapped to receive the locking screw. The screw may then be threaded by machine into the plate and simultaneously peened over at its end so that the plate and screw form, in effect, a sub-assembly for mounting in the stud. This greatly simplifies the manufacturing operations since the construction is not one in which it would be necessary to thread the screw up into the locking plate from the interior of the stud which would be a time consuming operation.

The outlet box is mounted on the stud by extending the threaded shank portion 17 of the stud through the opening 14 into the interior of the box. By tipping the stud at an angle and, at the same time, moving the stud transversely of the opening so that the wall of the outlet box forming the opening extends into one of the recesses 20, it is possible to move one of the extending lips 22 into the interior of the box. The width of the lips 22 is so proportioned that it is now possible to move the other lip through the opening 14 into the interior of the outlet box by moving the stud to an upright position, as shown by Fig. 4. Thereafter, the stud is centered in the opening so that the surfaces 23 of the lips engage the interior wall of the outlet box and the aforementioned shoulder 19 extends upwardly into the plane of the opening 14 to assist in centering the stud. The distance across the extremities of the lips 22 is greater than the diameter of the opening 14 so that the stud cannot be pulled out of the box except by tipping it in the manner aforementioned.

After the outlet box has been mounted on the stud, a screw driver is inserted into engagement with the locking screw 29 and the screw is rotated to lock both the outlet box and the supporting stud in position. Since the locking screw is threaded into the plate 24 and bears against the bar hanger, in the manner shown by Fig. 4, the plate 24 will be moved downwardly sliding in the grooves 28 until it engages the outer wall of the outlet box. Further tightening of the screw will securely lock the stud in position on the bar hanger since movement of the locking plate 24 is prevented by engagement with the wall of the box and the screw then tends to force the bar hanger into engagement with the upper wall of the opening 18. When this occurs, the whole stud is moved upwardly to bring the surfaces 23 of the lips into engagement with the interior wall of the outlet box so that the stud itself is clamped in position on the outlet box. In this manner, the wall of the box is clamped between the lips 22 and the locking plate 24 and the bar hanger is clamped between the end of screw 29 and the upper wall of the opening 18. Since the lips 22 extend at right angles to the locking plate, the latter does not interfere with the insertion of the lips into the interior of the box in the manner illustrated by Figs. 3 and 4.

My device provides a construction in which only a single adjustment is necessary to secure the outlet box to the stud and at the same time lock the stud in any chosen position on the bar hanger. The enlarged portions of the stud formed by the lips 22 take up a minimum of room within the outlet box, thereby increasing the amount of space available for wiring. Adjustment of the outlet box or of the mounting stud may be made at any time simply by inserting a screw driver into the interior of the box and loosening the locking screw. This may be done without removing any of the wires from the box whereas in former constructions in which the box was mounted on the stud by means of a lock nut, it was necessary to remove the wires before a pair of pliers could be inserted in the box to loosen the nut. The locking screw 29 is disposed substantially within the interior of the stud and does not take up any additional room within the outlet box, nor does it interfere with threading of a fixture hickey on the threaded shank of the stud. The end of slot 25 is spaced from the end of the threaded shank 17 so that several complete threads are available to facilitate threading of a hickey.

While my invention has been illustrated and described in connection with a stud provided with a threaded shank, it should be manifest that in some cases the threads may be omitted if it is not desired to mount an electrical fixture. The stud has also been described as provided with the recesses 20 in opposite sides; in some instances, however, only a single recess is necessary as long as it is deep enough to permit the lips 22 to be inserted through the box opening upon tipping the stud. The advantage of using two recesses is that more freedom is given the electrician in inserting the stud from either side.

What I claim as new and desire to secure by Letters Patent of the United States, is:

1. A support for mounting an outlet box on a bar hanger comprising a stud having a transverse opening for receiving a bar hanger, said stud also having a transverse slot therein, a clamping member mounted in said slot for movement axially of said stud, a screw carried by said member extending into said opening and adapted to engage the bar hanger, said stud being provided with projecting portions and a recess adjacent thereto whereby said stud may be tipped at an angle and inserted through an opening in the wall of an outlet box, said clamping member and said projecting portions each having portions extending beyond the perimeter of the opening in the outlet box for engaging the outer and inner walls of the outlet box, respectively, whereby the wall of the box is clamped between said member and said projecting portions and the bar hanger is clamped between said screw and a wall of said transverse opening upon tightening of said screw.

2. In a support for mounting an outlet box on a bar hanger, a stud adapted to be inserted in an opening in the outlet box, said stud having a transverse opening at one end thereof and a transverse slot merging with said opening, said opening being adapted to receive a bar hanger, a clamping plate slidably mounted in said slot for movement axially of said stud, a locking screw carried by said plate and engaging the bar hanger and projections extending from opposite sides of said stud, said clamping plate and said projections each having portions extending beyond the perimeter of the opening in the outlet box for engaging the outer and inner walls of the outlet box, respectively, whereby a wall of the outlet box is clamped between said plate and said projections and the bar hanger is clamped between said screw and a wall of said opening upon tightening of said screw.

3. In a support for mounting an outlet box on a bar hanger, a stud adapted to be received in an opening in the outlet box, said stud having a transverse opening and a transverse slot merging with said opening, said opening being adapted to receive a bar hanger, a clamping plate slidably mounted in said slot for movement axially of said stud, means preventing movement of the plate transversely of said stud, a screw carried by said plate extending into the opening and engaging the bar hanger and projections extending from opposite sides of said stud, said clamping plate and said projections each having portions extending beyond the perimeter of the opening in the outlet box for engaging the outer opening in the outlet box for engaging the outer and inner walls of the outlet box, respectively, whereby a wall of the outlet box is clamped between said plate and said projections and the bar hanger is clamped between said screw and a wall of said opening.

4. In a support for mounting an outlet box on a bar hanger, a stud adapted to be received in an opening in the outlet box, said stud having a recess for receiving the bar hanger, said stud being provided with outwardly extending projections spaced apart a distance greater than the diameter of the opening in the outlet box, at least one side of said stud being formed with a recess adjacent one of said projections whereby said stud may be tipped at an angle and inserted through the opening so that the projections engage the inner wall of the outlet box, said stud having a slot therein, a clamping member mounted in said slot for movement axially of said stud, said clamping member extending across the opening in the outlet box and adapted to engage the outer wall of the box, and a screw carried by said member adapted to engage the bar hanger, the wall of the box being clamped between said member and said projections and the bar hanger being clamped between said screw and a wall of said recess.

5. In a support for mounting an outlet box on a bar hanger, a stud adapted to be received in an opening in the outlet box, said stud having a transverse opening for receiving the bar hanger, means extending outwardly from said stud a distance greater than the diameter of the opening in the outlet box, said stud being formed with a recess adjacent said outwardly extending means whereby said stud may be tipped at an angle and inserted through the opening so that the extending means engages the inner wall of the outlet box, movable means carried by said stud for engaging the outer wall of the box, and a screw carried by said movable means adapted to engage the bar hanger, the wall of the box being clamped between said movable means and said outwardly extending means and the bar hanger being clamped between said screw and a wall of said transverse opening upon tightening of said screw.

6. In a support for mounting an outlet box on a bar hanger, a stud adapted to be received in an opening in the outlet box, said stud having means for receiving a bar hanger, means extending outwardly from said stud a distance greater than the diameter of the opening in the outlet box, said stud being formed with a portion of reduced diameter adjacent said outwardly extending means whereby said stud may be tipped at an angle and inserted through the opening so that the extending means engages the inner wall of the outlet box, movable means carried by said stud for engaging the outer wall of the box, an adjustable device connected to said movable means and adapted to engage the bar hanger to move the movable means into engagement with the outer wall of the box, the wall of the box being clamped between said movable means and said outwardly extending means and the bar hanger being clamped between said adjustable device and a portion of said stud.

EDWARD B. CLARK.